July 2, 1929. R. SHOWMIN 1,719,674
VALVE MECHANISM
Filed June 26, 1924 2 Sheets-Sheet 1
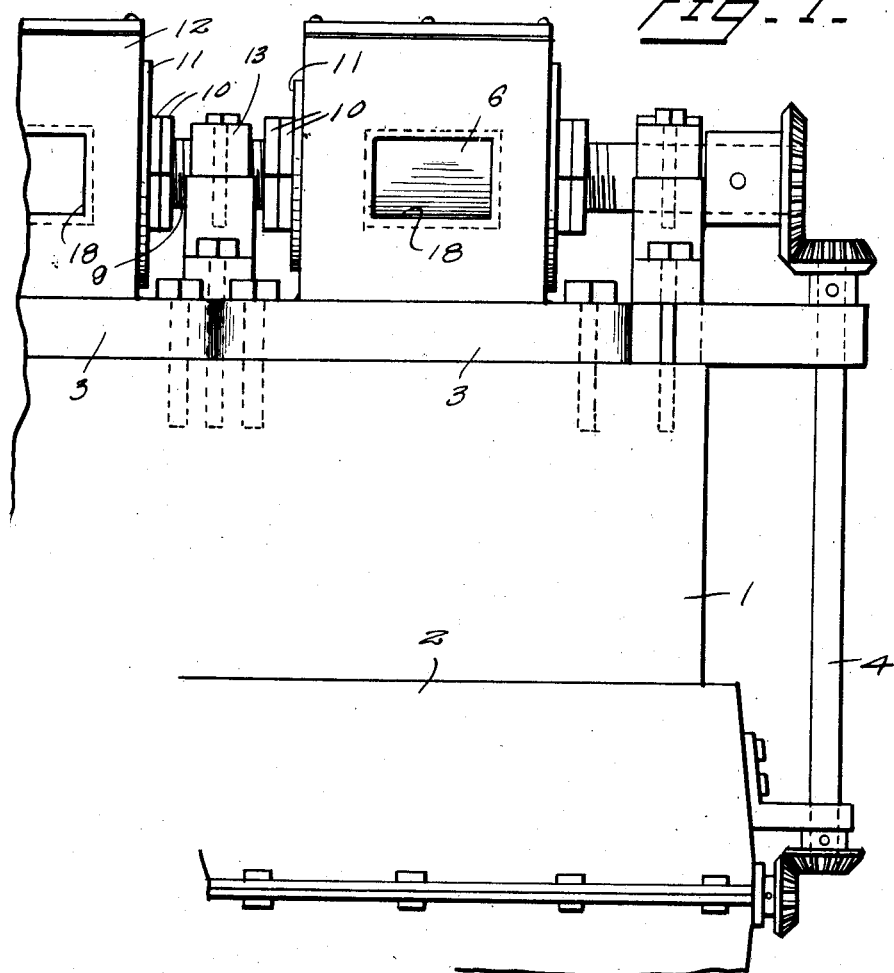
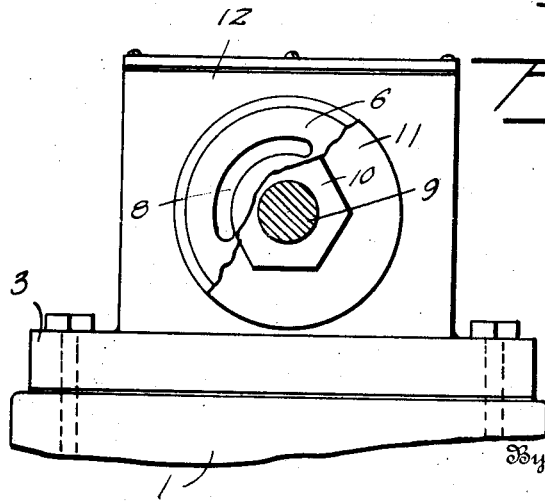
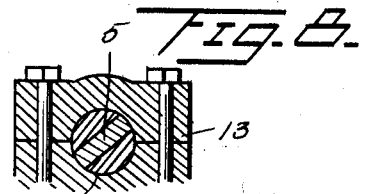
Inventor
R. Showmin July 2, 1929. R. SHOWMIN 1,719,674
VALVE MECHANISM
Filed June 26, 1924 2 Sheets-Sheet 2
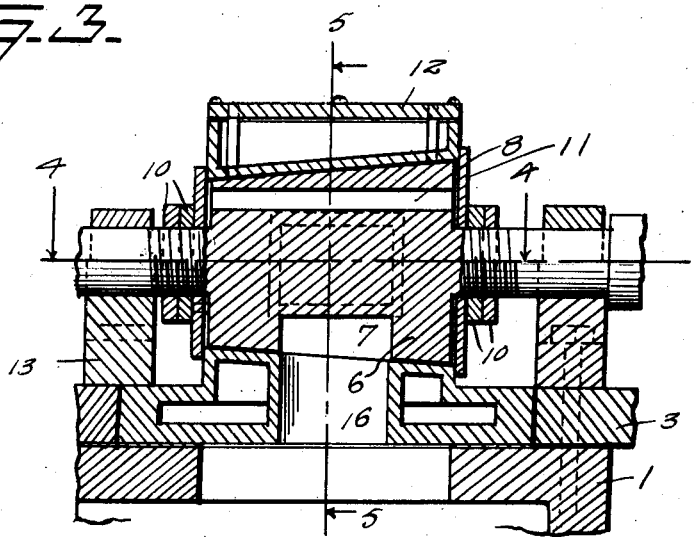
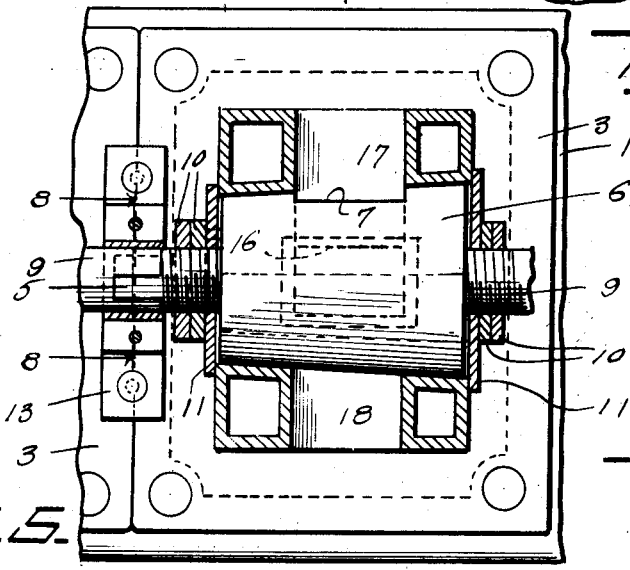
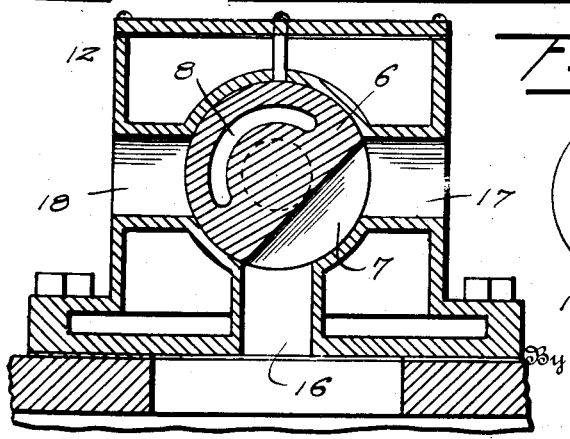
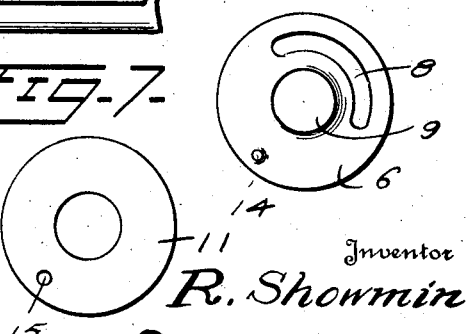
Inventor
R. Showmin Patented July 2, 1929.

1,719,674

UNITED STATES PATENT OFFICE.

ROSS SHOWMIN, OF TOLEDO, OHIO.

VALVE MECHANISM.

Application filed June 26, 1924. Serial No. 722,562.

The present invention has reference to internal combustion engines and more particularly to the valve mechanism for controlling the inlet and the exhaust and in accordance with the present invention, the valve mechanism is of the rotary type and one of the principal objects is provision for adjustment to compensate for wear and slight differences in construction when assembling the parts.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is an elevational view of part of an internal combustion engine provided with a valve mechanism embodying the invention;

Figure 2 is a fragmentary end view, the shaft being in section and a portion of the valve casing being broken away;

Figure 3 is a detail longitudinal sectional view showing more clearly the relative position of the parts comprising the valve mechanism;

Figure 4 is a detail sectional view on the line 4—4 of Figure 3;

Figure 5 is a detail sectional view on the line 5—5 of Figure 3;

Figure 6 is an end view of the rotary valve;

Figure 7 is an elevational view of a washer associated with the valve and valve casing; and Figure 8 is a detail sectional view on the line 8—8 of Figure 4.

Corresponding and like parts are referred to in the following description and designated in the several views of the drawings by like reference characters.

The numeral 1 designates the block of an internal combustion engine, 2 the crank case, 3 the head of the engine block and 4 a shaft for transmitting movement from the crank shaft to the rotary valve. For convenience of construction and assembling the parts, the shaft of the valve mechanism is sectional and the several sections are connected by means of an interlocking joint 5 to cause them to rotate in unison. A rotary valve 6 is provided for each section of the shaft and preferably forms a part thereof. The valve 6 tapers throughout its length and is cut away upon one side as indicated at 7 to provide a passage for the inflow of the motive medium and for the outflow of the exhaust. A space 8 is provided in the side of the valve opposite the cut away portion 7 to counter-balance the same. Portions of the valve stem or shaft adjacent the ends of the valve are threaded as indicated at 9 to receive a pair of nuts 10 by means of which the valve is adjusted and held in the required adjusted position. Washers 11 are mounted upon the valve stem and are held against the ends of the valve casing 12 and serve to close the opening in which the valve 6 is mounted.

The valve casing 12 is hollow to admit of a cooling medium such as water being circulated therethrough. The valve casing is preferably separately formed from the head 3 and its base fits within an opening formed in the cylinder head 3. As indicated most clearly in Figure 4, the interlocking joint 5 between the sections of the valve shaft or stem is in line with the bearing 13 which serves to hold the parts in place. A pin 14 projecting from an end of the valve enters an opening 15 of a washer 11 and causes said washer and valve to rotate in unison.

A close joint is obtained and maintained between the valve and its casing by adjustment of the nuts 10, it being understood that backing of the nuts at one end of the valve and advancing of the nuts at the opposite end of the valve results in a longitudinal adjustment of the valve, the same being held in the required adjusted position by tightening the nuts, one forming a lock for the other. The numeral 16 designates a passage through which the motive medium enters the cylinder and through which the burnt gases escape. The inlet is designated by the numeral 17 and the outlet by the numeral 18 and in the rotation of the valve the passage 17 alternately connects the passage 16 with the inlet 17 and the exhaust 18. The space of the valve casing is in communication with the space of the water jacket of the cylinder so that the water circulated therethrough may cool both the engine and the valve mechanism.

What is claimed is:—

An internal combustion engine having cylinders, a plurality of individual casings, each casing having a relatively flat and large base disposed on the cylinders, said bases extending longitudinally beyond the casings to serve as attaching means and to substantially completely form a head for the engine and also constitute a support for bearing, bearings on said bases, each casing having an opening therethrough, valves rotatably mounted one in each casing and controlling said opening thereof, and shaft connections for said valves journaled in said bearings.

In testimony whereof I affix my signature.

ROSS SHOWMIN.